US012558929B2

(12) United States Patent
Abe et al.

(10) Patent No.: US 12,558,929 B2
(45) Date of Patent: Feb. 24, 2026

(54) SENSOR FOR TIRES

(71) Applicant: Hitachi Astemo, Ltd., Hitachinaka (JP)

(72) Inventors: Hiroyuki Abe, Hitachinaka (JP);
Tsukasa Takahashi, Hitachinaka (JP);
Kenji Yoshihara, Hitachinaka (JP);
Takeo Hosokawa, Hitachinaka (JP)

(73) Assignee: Hitachi Astemo, Ltd., Hitachinaka (JP)

( * ) Notice: Subject to any disclaimer, the term of this
patent is extended or adjusted under 35
U.S.C. 154(b) by 258 days.

(21) Appl. No.: 18/271,984

(22) PCT Filed: Sep. 17, 2021

(86) PCT No.: PCT/JP2021/034339
§ 371 (c)(1),
(2) Date: Jul. 12, 2023

(87) PCT Pub. No.: WO2022/172499
PCT Pub. Date: Aug. 18, 2022

(65) Prior Publication Data
US 2024/0118174 A1      Apr. 11, 2024

(30) Foreign Application Priority Data

Feb. 9, 2021    (JP) .................................. 2021-019112

(51) Int. Cl.
*G01M 17/02* (2006.01)
*B60C 23/04* (2006.01)
(Continued)

(52) U.S. Cl.
CPC .............. *B60C 23/20* (2013.01); *B60C 23/04*
(2013.01); *G01K 1/14* (2013.01); *G01M 17/02*
(2013.01);
(Continued)

(58) Field of Classification Search
CPC ........ G01M 17/02; B60C 23/04; B60C 23/20;
B60C 2019/004; G01K 1/14; G01K 13/08
See application file for complete search history.

(56) References Cited

U.S. PATENT DOCUMENTS

| | | | |
|---|---|---|---|
| 5,500,065 A | 3/1996 | Koch et al. | |
| 6,921,197 B2 * | 7/2005 | Aubel ..................... | B60C 23/20 |
| | | | 73/146 |

(Continued)

FOREIGN PATENT DOCUMENTS

| | | | |
|---|---|---|---|
| JP | 55-22509 Y2 | 5/1980 | |
| JP | 8-67117 A | 3/1996 | |

(Continued)

OTHER PUBLICATIONS

International Search Report (PCT/ISA/210) issued in PCT Application No. PCT/JP2021/034339 dated Nov. 30, 2021 with English translation (8 pages).

(Continued)

*Primary Examiner* — Jill E Culler
(74) *Attorney, Agent, or Firm* — Crowell & Moring LLP

(57) ABSTRACT

The present disclosure provides a sensor for tires capable of measuring a physical quantity including a temperature of a tire. An aspect of the present disclosure is a sensor for tires including: a base portion 5 fixed to an inside of a tire T and in contact with the tire T, and a sensor chip 7 including a tire temperature detection unit that detects the temperature of the tire T through the base portion 5.

6 Claims, 11 Drawing Sheets

(51) Int. Cl.
    *B60C 23/20*      (2006.01)
    *G01K 1/14*      (2021.01)
    *B60C 19/00*      (2006.01)
    *G01K 13/08*      (2006.01)

(52) U.S. Cl.
    CPC ........ *B60C 2019/004* (2013.01); *G01K 13/08*
                                         (2013.01)

(56)                 References Cited

U.S. PATENT DOCUMENTS

| | | | | |
|---|---|---|---|---|
| 2005/0229690 A1 * | 10/2005 | Kikuchi | .................. | B60C 19/00 |
| | | | | 73/146 |
| 2021/0370727 A1 | 12/2021 | Yamaguchi | | |
| 2023/0114431 A1 * | 4/2023 | Yamaguchi | ............. | B60C 19/00 |
| | | | | 73/862.628 |

FOREIGN PATENT DOCUMENTS

| | | | |
|---|---|---|---|
| JP | 2006-213106 A | 8/2006 | |
| JP | 2017-88043 A | 5/2017 | |
| JP | 2017-154649 A | 9/2017 | |
| JP | 2020-55402 A | 4/2020 | |

OTHER PUBLICATIONS

Japanese-language Written Opinion (PCT/ISA/237) issued in PCT Application No. PCT/JP2021/034339 dated Nov. 30, 2021 (5 pages).

* cited by examiner

SENSOR FOR TIRES

TECHNICAL FIELD

The present disclosure relates to a sensor for tires.

BACKGROUND ART

Conventionally, an invention related to a functional component that houses an electronic component capable of acquiring information inside a tire and is attachable to an inner circumferential surface of the tire is known (PTL 1 below). This conventional functional component includes a housing portion of the electronic component, a housing having a bottom surface facing an inner circumferential surface of the tire, and a cylindrical portion extending from a peripheral edge of the bottom surface toward the inner circumferential surface (PTL 1, Claim 1).

According to such a configuration, a container having one opening formed by the housing and the cylindrical portion extending from the peripheral edge of the bottom surface of the housing toward the inner circumferential surface of the tire can be filled with an adhesive. Then, after the cylindrical body side is placed on the tire surface, the adhesive is cured, whereby it is possible to bond the functional component to the tire inner surface while securing the thickness of the adhesive (paragraph 0005 of the same).

The housing includes a housing case having a housing space for a module and a cap functioning as a lid body for the housing case (Paragraph 0011 of the same, FIG. 2). The module to be housed in the housing space of the housing case includes a circuit board on which an electronic component is mounted. The circuit board includes a plurality of sensors such as a temperature sensor, a pressure sensor, and an acceleration sensor that function as state acquisition means for acquiring a state inside the tire (paragraph 0022 of the same, FIG. 5, and the like).

CITATION LIST

Patent Literature

PTL 1: JP 2020-055402 A

SUMMARY OF INVENTION

Technical Problem

The conventional functional component measures the temperature and the pressure in the tire air chamber by the respective measuring units of the temperature sensor and the pressure sensor communicating with the inside of the tire air chamber through a hole provided in the cap (paragraph 0025 of the same). However, this conventional functional component cannot measure the temperature or the like of the tire itself.

The present disclosure provides a sensor for tires capable of measuring a physical quantity including a temperature of a tire.

Solution to Problem

An aspect of the present disclosure is a sensor for tires including: a base portion fixed to an inner side of a tire and being in contact with the tire; and a tire temperature detection unit configured to detect a temperature of the tire through the base portion.

Advantageous Effects of Invention

According to the present disclosure, a sensor for tires capable of measuring a physical quantity including a temperature of a tire can be provided.

DESCRIPTION OF EMBODIMENTS

Hereinafter, embodiments of the sensor for tires according to the present disclosure will be described with reference to the drawings.

First Embodiment

Figure 1:
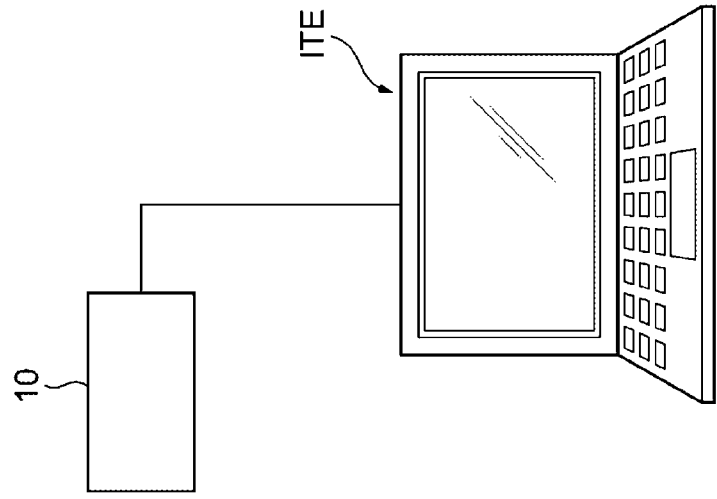
FIG. 1 is a schematic diagram showing a first embodiment of a sensor for tires according to the present disclosure.
Figure 1:
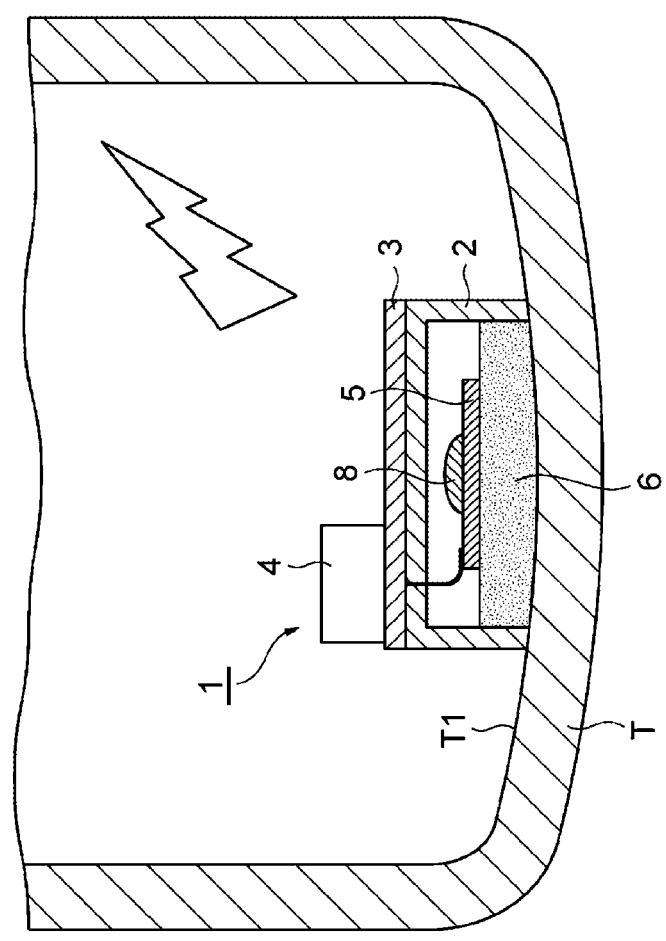
Figure 2:
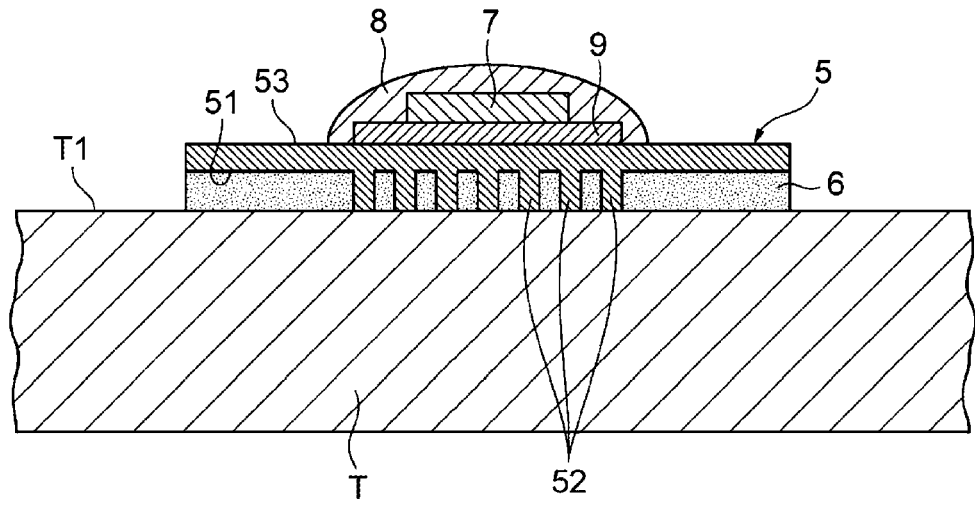
FIG. 2 is an enlarged view of a part of the sensor for tires shown in FIG. 1.

FIG. 1 is a schematic diagram showing a first embodiment of a sensor for tires according to the present disclosure. FIG. 2 is an enlarged view of a part of the sensor for tires 1 shown in FIG. 1. It should be noted that in the schematic diagram in FIG. 1, the sensor for tires 1 is enlarged with respect to a tire T.

The sensor for tires 1 of the present embodiment is installed inside a tire T of a vehicle, for example, and detects a physical quantity of the tire T including a temperature of the tire T. More specifically, the sensor for tires 1 is fixed to, for example, an inner liner exposed to the inner surface T1 of the tread portion of the tire T. The sensor for tires 1 includes, for example, a housing 2, a circuit board 3, a battery 4, a base portion 5, an adhesive 6, a sensor chip 7, and a sealing portion 8.

The housing 2 is made of, for example, resin, and houses inside the base portion 5, the adhesive 6, and the sensor chip 7. For example, the housing 2 has an end portion in contact with the tire T opened, and is fixed to the inner liner of the tire T through the adhesive 6. The circuit board 3 is attached to an end portion of the housing 2 opposite to the end portion fixed to the tire T.

The circuit board 3 includes, for example, a power supply IC and a wireless communication LSI (not shown). The battery 4 is attached to the circuit board 3 and connected to the power supply IC. The power supply IC of the circuit board 3 is connected to, for example, the wireless communication LSI and the sensor chip 7, and supplies the power stored in the battery to the wireless communication LSI and the sensor chip 7. The wireless communication LSI of the circuit board 3 is connected to the sensor chip 7, and transmits the detection result of the physical quantity by the sensor chip 7 to the outside by wireless communication.

The receiving unit 10 disposed outside the tire T includes, for example, a wireless communication LSI, and receives the detection result of the physical quantity of the tire T transmitted from the sensor for tires 1. The receiving unit 10 outputs the received detection result of the physical quantity of the tire T to the external information processing device ITE, for example. In addition, the receiving unit 10 is mounted on a vehicle including the tire T, for example, and outputs a detection result of the physical quantity of the tire T to an electronic control unit (ECU) of the vehicle.

Figure 3:
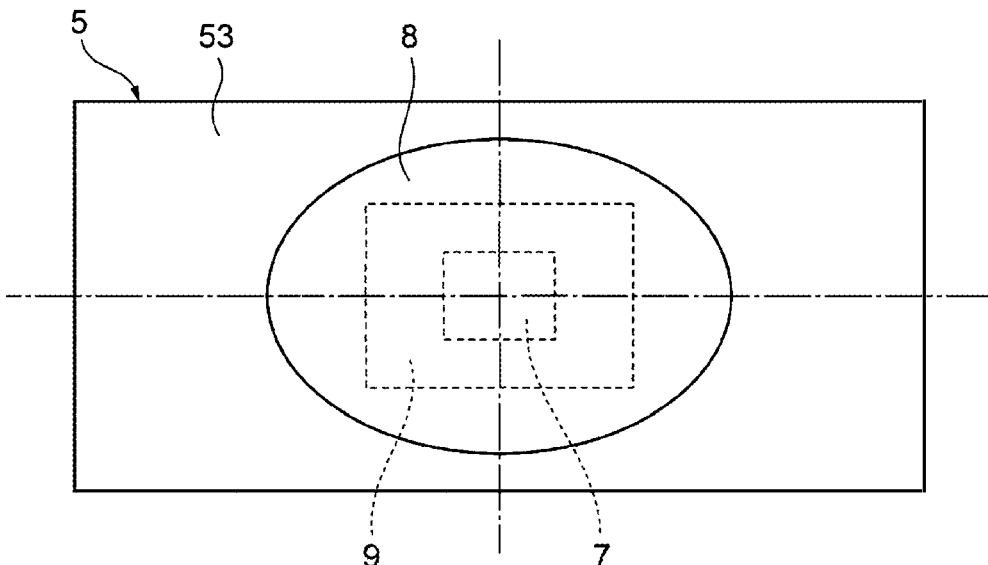
FIG. 3 is a top view of a base portion of the sensor for tires shown in FIG. 2.
Figure 4:
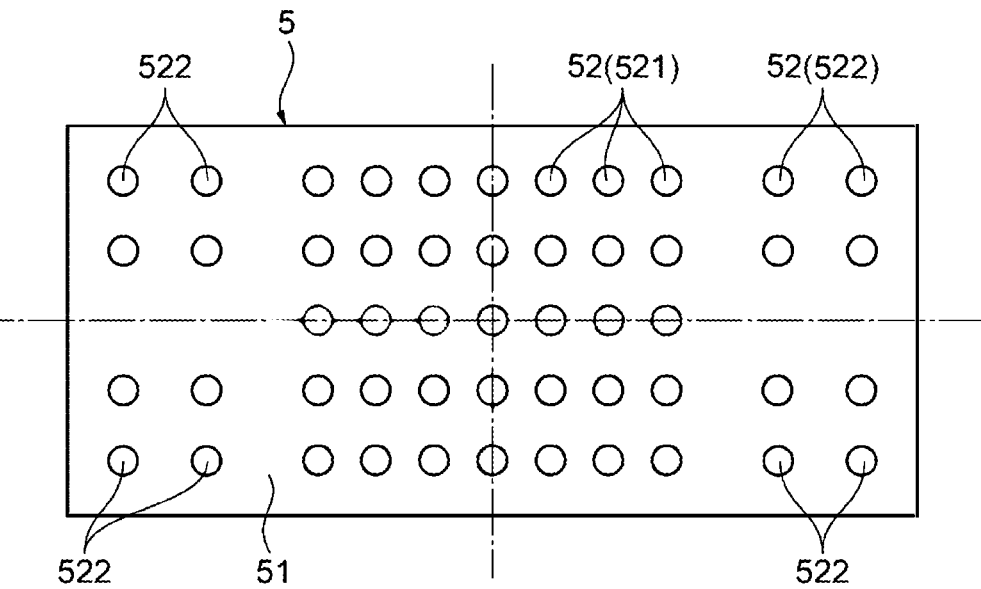
FIG. 4 is a bottom view of a base portion of the sensor for tires shown in FIG. 2.

FIG. 3 is a top view of the base portion 5 shown in FIG. 2. FIG. 4 is a bottom view of the base portion 5 shown in FIG. 2. The base portion 5 is, for example, a plate-shaped member made of metal. As the material of the base portion 5, a metal having a small difference in linear expansion coefficient from a semiconductor material such as silicon (Si) can be used. For example, by using a 42 alloy having a linear expansion coefficient of about 5 [ppm/° C.] as a material of the base portion 5, the difference in a linear expansion coefficient from silicon (Si) having a linear expansion coefficient of about 4 [ppm/° C.] can be made to about 1 [ppm/° C.].

As described above, by using metal having a small difference in linear expansion coefficient from the semiconductor material as the material of the base portion 5, it is possible to reduce the warpage of the base portion 5 on which the sensor chip 7 is mounted. As a result, when the sensor chip 7 includes a tire strain detection unit, the detection accuracy of the strain of the tire T by the sensor for tires 1 can be improved. In addition, as the material of the base portion 5, stainless steel, aluminum, copper, an iron-based alloy, or a material obtained by plating a base metal with gold, nickel, tin, or the like may be used from the viewpoint of corrosion resistance against sulfur gas generated from the tire T.

The base portion 5 is fixed to the inside of the tire T and is in contact with the tire T, for example. The base portion 5 includes, for example, a bottom surface 51 facing the inner surface T1 of the tire T and a plurality of protruding portions 52 protruding from the bottom surface 51 toward the inner surface T1 of the tire T. The bottom surface 51 of the base portion 5 is fixed to the inner surface T1 of the tire T through the adhesive 6. The plurality of protruding portions 52 of the base portion 5 are in contact with the tire T. In the example shown in FIG. 2, the tip portion of the protruding portion 52 is in contact with the inner surface T1 of the tire T.

The base portion 5 has, for example, a rectangular bottom surface 51 and top surface 53. It should be noted that the shape of the base portion 5 is not particularly limited, and may be a circle, an ellipse, or another polygon. The top surface 53 of the base portion 5 is disposed with a sensor chip 7 through a bonding material 9. Furthermore, the top surface 53 of the base portion 5 is disposed with a sealing portion 8 that covers the sensor chip 7 and the bonding material 9. The plurality of protruding portions 52 protruding from the bottom surface 51 of the base portion 5 can be formed by, for example, drawing the base portion 5 made of metal.

Although not particularly limited, for example, when the thickness of the base portion 5 is 0.2 [mm] and the dimension in the lateral direction is 5 [mm], the outer diameter of the cylindrical protruding portion 52 can be made 0.4 [mm] or more. The shape of the protruding portion 52 is not limited to a cylindrical shape, and any shape, such as an elliptical cylindrical shape, a polygonal cylindrical shape, a solid columnar shape, a solid elliptical columnar shape, or a solid polygonal columnar shape, can be selected.

In addition, from the viewpoint of securing the contact area between the base portion 5 and the tire T, the outer diameter of the protruding portion 52 can be made, for example, about 1 [mm]. In addition, when the thickness of the base portion 5 is 0.2 [mm] and the dimension in the lateral direction is 5 [mm], the pitch of the protruding portion 52 can be made, for example, 0.4 [mm] or more. In addition, from the viewpoint of securing the contact area between the base portion 5 and the tire T, the pitch of the protruding portion 52 can be made, for example, in the range of 1 [mm] or less.

In addition, when the thickness of the base portion 5 is 0.2 [mm], the dimension in the lateral direction is 5 [mm], the outer diameter of the protruding portion 52 is 1 [mm], and the pitch of the protruding portion 52 is 0.5 [mm], the protruding portion 52 can be arranged in a 3×4 rectangular shape of three in the lateral direction and four in the longitudinal direction. In this example, the contact area between the tips of the protruding portions 52 and the inner surface T1 of the tire T is about 1.5 times the installation area of the sensor chip 7 in the base portion 5. It should be noted that the contact area between the plurality of protruding portions 52 and the tire T can be, for example, equal to or larger than the installation area of the sensor chip 7 in the base portion 5.

The plurality of protruding portions 52 include, for example, a plurality of first protruding portions 521 disposed at the central portion of the base portion 5 and a plurality of second protruding portions 522 disposed at the peripheral edge portions of the base portion 5. In the example shown in FIG. 4, the plurality of first protruding portions 521 are disposed at the central portion in the longitudinal direction of the rectangular base portion 5, and are disposed from the central portion to the peripheral edge portions in the lateral direction of the base portion 5. In addition, in the example shown in FIG. 4, the plurality of second protruding portions 522 are disposed at both end portions in the lateral direction of the base portion 5 at both end portions in the longitudinal direction of the base portion 5. The density of the first protruding portions 521 is higher than the density of the second protruding portions 522, for example.

The adhesive 6 adheres and fixes the base portion 5 to the inner surface T1 of the tire T. As the adhesive 6, for example, an elastic adhesive can be used. The elastic adhesive is, for example, a rubber-based adhesive that becomes an elastic body similar to the tire T after curing. For example, as the adhesive 6, a silicone-based or urethane-based adhesive can be used from the viewpoint of adhesiveness to the tire T, approximation to hardness of the tire T, and the like. The thermal resistance of the adhesive 6 is higher than, for example, the thermal resistance of the base portion 5 or the thermal resistance of the bonding material 9 that bonds the base portion 5 and the sensor chip 7. That is, the thermal conductivity of the adhesive 6 is lower than the thermal conductivity of the base portion 5 or the thermal conductivity of the bonding material 9, for example.

The sensor chip 7 is, for example, an IC chip manufactured by a semiconductor process, and includes a tire temperature detection unit that detects the temperature of the tire T through the base portion 5. In addition, the sensor chip 7 includes, for example, a tire strain detection unit that detects strain of the tire T through the base portion 5. In addition, the sensor chip 7 may include, for example, an acceleration detection unit, a humidity detection unit, a rotation detection unit, or the like. The sensor chip 7 is, for example, a rectangular MOSFET sensor chip having a size of about 5 [mm]×5 [mm] at the maximum. The sensor chip 7 is disposed at the central portion of the top surface 53 of the base portion 5, and is bonded to the top surface 53 of the base portion 5 by the bonding material 9.

The tire temperature detection unit of the sensor chip 7 detects the temperature using the temperature dependence (temperature counting) of the Si diode formed by the CMOS process. It should be noted that when the sensor chip 7 includes only a tire temperature detection unit, the tire temperature detection unit is, for example, a negative characteristic (NTC) thermistor or a positive characteristic (PCT) thermistor. The tire strain detection unit of the sensor chip 7 includes, for example, a semiconductor formed by the CMOS process and a microelectromechanical system (MEMS).

The bonding material 9 bonds the sensor chip 7 to the top surface 53 of the base portion 5. As the bonding material 9, for example, an epoxy-based adhesive having high hardness can be used. From the viewpoint of reducing the thermal resistance of the bonding material 9 and improving the temperature detection accuracy of the tire temperature detection unit of the sensor chip 7, the bonding material 9 is preferably applied as thin as possible.

The sealing portion 8 is disposed on the top surface 53 of the base portion 5 and covers the sensor chip 7 and the bonding material 9. More specifically, the sealing portion 8 seals the bonding wire connected to the sensor chip 7 to protect the bonding wire from the external environment. As a material of the sealing portion 8, for example, epoxy, urethane, silicone, or the like can be used. In many cases, from the viewpoint of shape protection of the bonding wire, an epoxy resin is used as the sealing portion 8.

Hereinafter, the action of the sensor for tires 1 of the present embodiment will be described.

As described above, the sensor for tires 1 of the present embodiment includes the base portion 5 fixed to the inside of the tire T and in contact with the tire T, and the sensor chip 7 including the tire temperature detection unit that detects the temperature of the tire T through the base portion 5.

With this configuration, the sensor for tires 1 can detect the temperature of the tire T through the base portion 5 by the tire temperature detection unit of the sensor chip 7. In addition, since the tire temperature detection unit of the sensor chip 7 can detect the temperature of the tire T without through the adhesive 6, it is possible to more accurately detect the temperature of the tire T as compared with the case of measuring the temperature of the tire T through the adhesive 6. As a result, it is possible to more accurately correct the rolling resistance coefficient of the tire T near the freezing point temperature at which the tire T is likely to slip using the temperature of the tire T measured by the sensor for tires 1.

In addition, in the sensor for tires 1 of the present embodiment, the base portion 5 includes a bottom surface 51 facing the inner surface T1 of the tire T, and a plurality of protruding portions 52 protruding from the bottom surface 51 toward the inner surface T1 of the tire T. In addition, the bottom surface 51 of the base portion 5 is fixed to the inner surface T1 of the tire T through the adhesive 6, and the plurality of protruding portions 52 are in contact with the tire T.

With this configuration, the sensor for tires 1 can detect the temperature of the tire T through the base portion 5 including the plurality of protruding portions 52 in contact with the tire T. Therefore, even when the base portion 5 is fixed to the tire T through the adhesive 6, the tire temperature detection unit of the sensor for tires 1 can detect the temperature of the tire T through the base portion 5 without through the adhesive 6. Therefore, the temperature of the tire T can be more accurately detected as compared with the case where the temperature of the tire T is measured through the adhesive 6.

In addition, in the sensor for tires 1 of the present embodiment, the contact area between the plurality of protruding portions 52 and the tire T is equal to or larger than the installation area of the sensor chip 7 as the tire temperature detection unit in the base portion 5.

With this configuration, heat transfer between the base portion 5 and the tire T can be promoted, and the correlation between the temperature of the base portion 5 and the temperature of the tire T can be further improved. Therefore, the sensor for tires 1 can more accurately detect the temperature of the tire T through the base portion 5 by the tire temperature detection unit of the sensor chip 7.

In addition, in the sensor for tires 1 of the present embodiment, the sensor chip 7 as the tire temperature detection unit is disposed at the central portion of the base portion 5. In addition, the plurality of protruding portions 52 of the base portion 5 include a plurality of first protruding portions 521 disposed at the central portion of the base portion 5 and a plurality of second protruding portions 522 disposed at the peripheral edge portions of the base portion 5. Then, the density of the first protruding portions 521 is higher than the density of the second protruding portions 522.

With this configuration, at the central portion of the base portion 5 where the sensor chip 7 as the tire temperature detection unit is disposed, the heat transfer between the tire T and the base portion 5 is promoted by the first protruding portions 521 having a high density. Therefore, the temperature of the tire T can be more accurately detected through the base portion 5 by the temperature detection unit of the sensor chip 7. In addition, by the second protruding portion 522 of the peripheral edge portion of the base portion 5 being in contact with the inner surface T1 of the tire T, the distance between the bottom surface 51 of the base portion 5 and the inner surface T1 of the tire T becomes uniform, and the thickness of the adhesive 6 can be made uniform.

In addition, in the sensor for tires 1 of the present embodiment, the sensor chip 7 includes a tire strain detection unit that detects strain of the tire T through the base portion 5.

With this configuration, the sensor for tires 1 can detect the strain of the tire T, which is a physical quantity of the tire T, by the tire strain detection unit of the sensor chip 7. Furthermore, in the sensor for tires 1, since the sensor chip 7 includes the tire temperature detection unit, temperature correction of the detected strain of the tire T can be performed, and the strain of the tire T can be more accurately detected. In addition, as described above, the sensor for tires 1 can detect the strain of the tire T with higher accuracy by adopting the configuration in which the thickness of the adhesive 6 can be made uniform. In addition, by arranging the plurality of first protruding portions 521 in a rectangular shape according to the ratio of the dimension in the longitudinal direction and the dimension in the lateral direction of the base portion 5, the base portion 5 is deformed in a well-balanced manner according to the deformation of the tire T, and the detection accuracy of the tire strain detection unit is improved.

Figure 5:
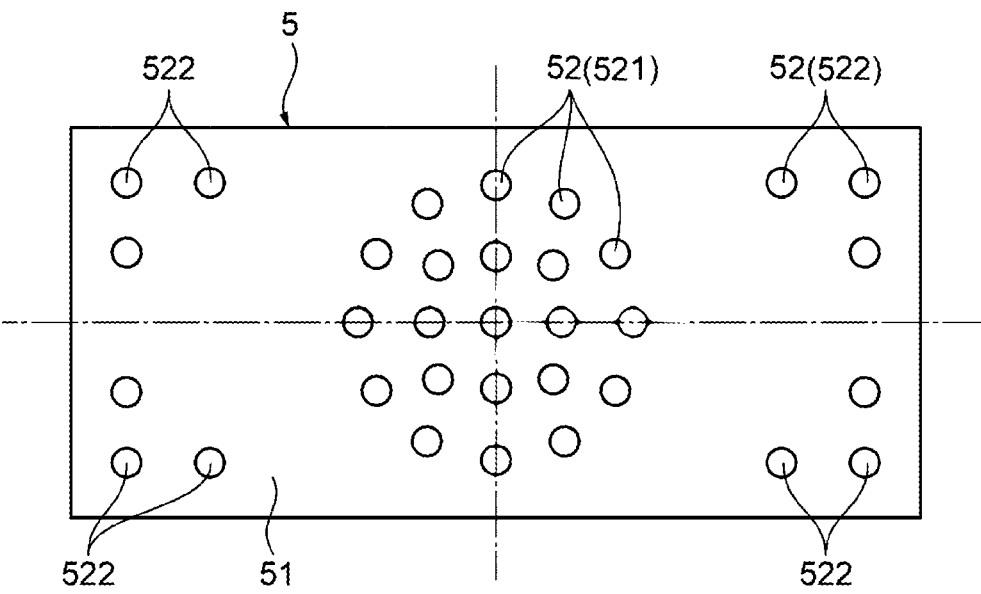
FIG. 5 is a bottom view of a base portion showing a modification in FIG. 4.
Figure 6:
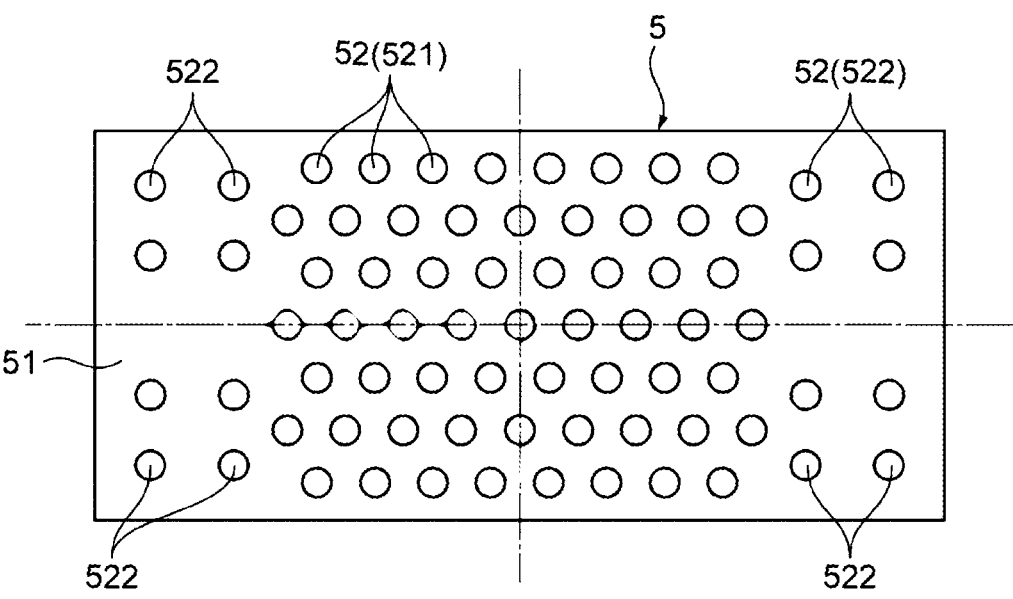
FIG. 6 is a bottom view of a base portion showing a modification in FIG. 4.

It should be noted that the configuration of the sensor for tires according to the present disclosure is not limited to the configuration of the sensor for tires 1 described above. Hereinafter, modifications of the sensor for tires 1 of the present embodiment will be described with reference to FIGS. 5 to 10. FIGS. 5 and 6 are bottom views of the base portion 5 showing modifications of the arrangement of the protruding portions 52 in FIG. 4. In addition, FIGS. 7 to 10 are enlarged views of a part of the sensor for tires 1 showing modifications of the protruding portions 52 in FIG. 2.

In the example shown in FIG. 5, the plurality of first protruding portions 521 of the base portion 5 of the sensor for tires 1 are radially arranged in a circular region centered at the center in the longitudinal direction and the lateral direction of the rectangular base portion 5. In addition, the plurality of second protruding portions 522 are arranged side by side in the longitudinal direction and the lateral direction at four corners of the rectangular base portion 5. Even in this arrangement of the protruding portions 52, it is possible to produce the same effect as in the arrangement of the protruding portions 52 shown in FIG. 4. Furthermore, by radially arranging the plurality of first protruding portions 521 from the center of the bottom surface 51 of the base portion 5, stress acting on the plurality of first protruding portions 521 due to strain of the tire T can be dispersed and uniformized. Accordingly, it is possible to prevent the first protruding portion 521 from being damaged and improve the detection accuracy of the strain of the tire T by the tire strain detection unit of the sensor chip 7.

In the example shown in FIG. 6, the plurality of first protruding portions 521 of the base portion 5 of the sensor for tires 1 are arranged in a zigzag shape from one end to the other end in the lateral direction at the central portion in the longitudinal direction of the rectangular base portion 5. In addition, the plurality of second protruding portions 522 are arranged in rectangular regions at four corners of the rectangular base portion 5. Even in this arrangement of the protruding portions 52, it is possible to produce the same effect as in the arrangement of the protruding portions 52 shown in FIG. 4. Furthermore, by arranging the plurality of first protruding portions 521 in a zigzag shape, it is possible to increase the number of the first protruding portions 521, to increase the contact area between the base portion 5 and the tire T, and to improve the detection accuracy of the temperature of the tire T by the tire temperature detection unit of the sensor chip 7.

Figure 7:
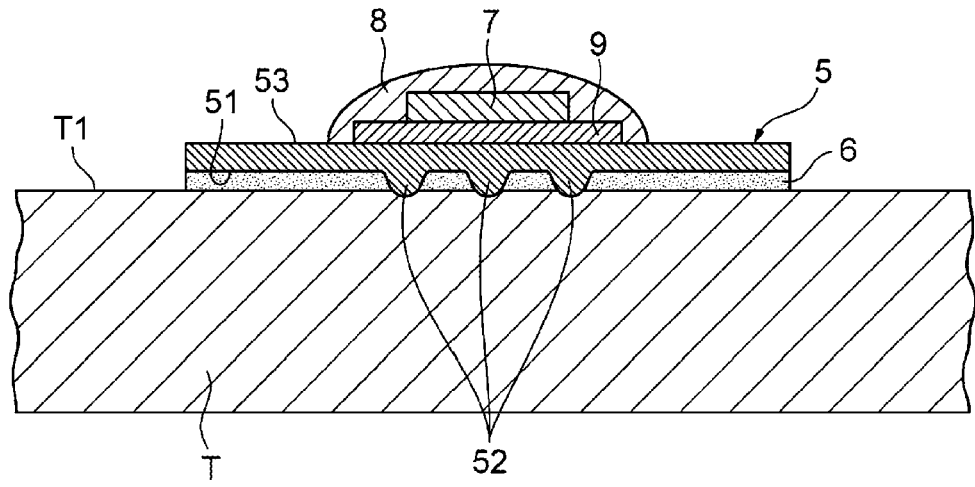
FIG. 7 is an enlarged view of a part of a sensor for tires showing a modification in FIG. 2.

In the example shown in FIG. 7, the base portion 5 of the sensor for tires 1 is fixed to the inner surface T1 of the tire T with the adhesive 6 interposed therebetween, in a state where the tip of the protruding portion 52 is pressed against the inner surface T1 of the tire T to compress and elastically deform the tire T in the thickness direction. The tip of the protruding portion 52 has, for example, a hemispherical shape or a convex curved shape. According to this protruding portion 52, it is possible not only to produce the same effect as the protruding portion 52 shown in FIG. 2, but also to more reliably bring the protruding portion 52 into contact with the tire T and to increase the contact area between the protruding portion 52 and the tire T.

Figure 8:
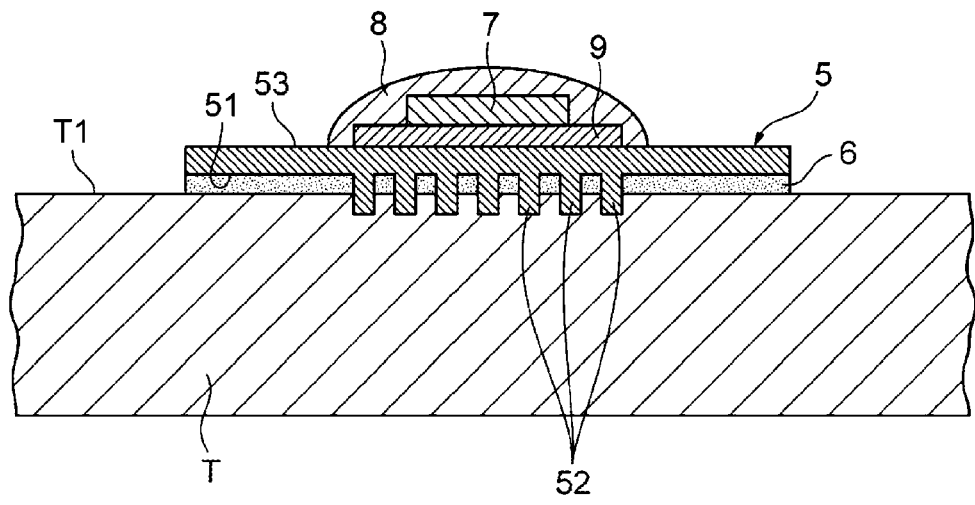
FIG. 8 is an enlarged view of a part of a sensor for tires showing a modification in FIG. 2.

In the example shown in FIG. 8, the base portion 5 of the sensor for tires 1 includes a plurality of protruding portions 52 to be inserted into the inner surface T1 of the tire T, and is fixed to the inner surface T1 of the tire T with the protruding portions 52 and the adhesive 6 interposed therebetween. With this configuration, the contact area between the protruding portions 52 and the tire T can be increased, the temperature of the base portion 5 can be brought closer to the temperature of the tire T, and the detection accuracy of the temperature of the tire T through the base portion 5 by the tire temperature detection unit of the sensor chip 7 can be further improved.

Figure 9:
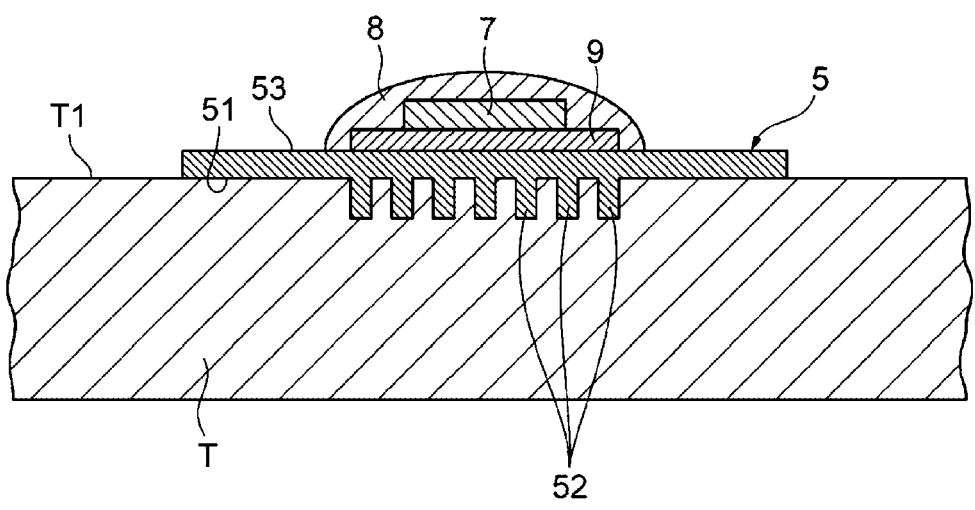
FIG. 9 is an enlarged view of a part of a sensor for tires showing a modification in FIG. 2.

In the example shown in FIG. 9, the base portion 5 of the sensor for tires 1 includes a plurality of protruding portions 52 to be inserted into the inner surface T1 of the tire T, and the bottom surface 51 and the protruding portions 52 are in direct contact with the tire T without through the adhesive 6. With this configuration, the base portion 5 can be fixed to the inner surface T1 of the tire T without using the adhesive 6, the contact area between the base portion 5 and the tire T is increased, and the physical quantity including the temperature and strain of the tire T can be detected by the sensor chip 7 through the base portion 5. It should be noted that in the example shown in FIG. 9, the protruding portion 52 may be prevented from falling off the tire T by having a barb at a tip portion to be inserted into the tire T.

Figure 10:
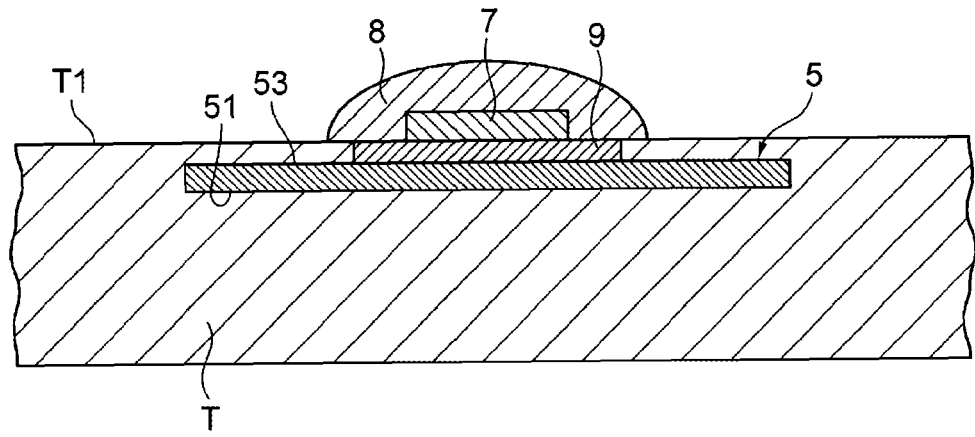
FIG. 10 is an enlarged view of a part of a sensor for tires showing a modification in FIG. 2.

In the example shown in FIG. 10, in the base portion 5 of the sensor for tires 1, at least a part of a portion where the sensor chip 7 including the tire temperature detection unit is not mounted is buried in the tire T. More specifically, for example, the base portion 5 is buried in the inner liner of the tire T except for a region where the bonding material 9 is disposed of the top surface 53. In addition, the base portion 5 does not need to include the protruding portion 52. The base portion 5 can be embedded in the inner liner of the tire T by, for example, insert molding. With this configuration, the temperature of the base portion 5 and the temperature of the tire T are substantially equal, and the temperature of the tire T can be detected with higher accuracy by the tire temperature detection unit of the sensor chip 7 through the base portion 5.

As described above, according to the present embodiment and the modifications thereof, it is possible to provide a sensor for tires 1 capable of measuring a physical quantity including the temperature of the tire T.

Second Embodiment

Figure 11:
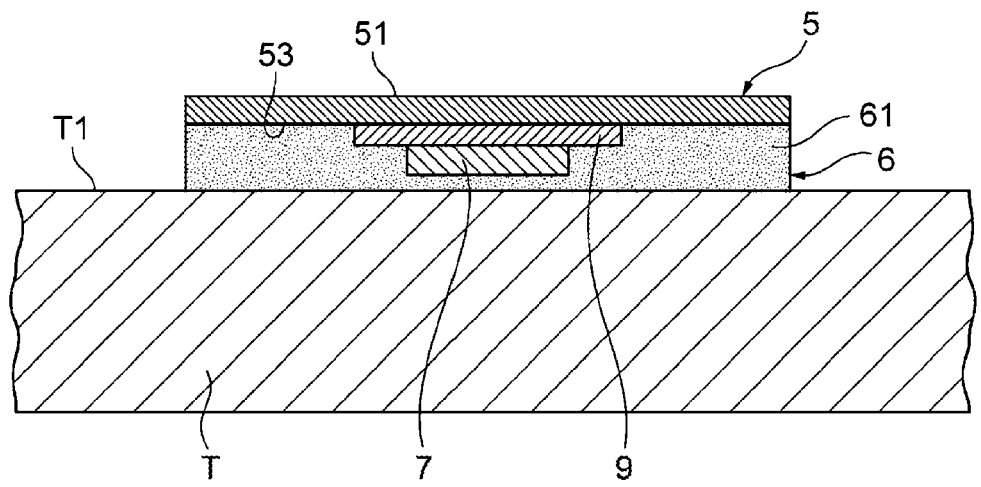
FIG. 11 is an enlarged view corresponding to FIG. 2 showing a second embodiment of a sensor for tires according to the present disclosure.

Next, a second embodiment of a sensor for tires according to the present disclosure will be described with assistance from FIG. 1 and reference to FIG. 11. FIG. 11 is an enlarged view corresponding to FIG. 2 of the sensor for tires 1 of the present embodiment. The sensor for tires 1 of the present embodiment includes a base portion 5 and an adhesive 6 that adheres the base portion 5 to the inside of the tire T. In addition, the sensor for tires 1 of the present embodiment includes a filler 61 having a higher thermal conductivity than the adhesive 6, and a sensor chip 7 including the tire temperature detection unit that is supported by the base portion 5 and detects the temperature of the tire T through the adhesive 6. The adhesive 6 has a thermal conductivity of 1 [W/mK] or more by being blended with the filler 61.

With this configuration, in the sensor for tires 1, by the tire temperature detection unit of the sensor chip 7, the temperature of the tire T can be detected with high accuracy through the adhesive 6 blended with the filler 61. As the filler 61, particles of an inorganic material such as boron nitride (BN) or aluminum nitride (AlN) having higher thermal conductivity than the adhesive 6 can be used.

As described above, the embodiments of the sensor for tires according to the present disclosure has been described in detail with reference to the drawings, but the concrete configuration is not limited to the embodiments, and any design change or the like in a scope without departing from the gist of the present disclosure is included in the present disclosure.

REFERENCE SIGNS LIST 1 sensor for tires
5 base portion
51 bottom surface
52 protruding portion
521 first protruding portion
522 second protruding portion
6 adhesive
61 filler
7 sensor chip (tire temperature detection unit, tire strain detection unit)
T tire
T1 inner surface

The invention claimed is:

1. A sensor for tires comprising:
a base portion fixed to an inner side of a tire and being in contact with the tire; and
a tire temperature detection unit configured to detect a temperature of the tire through the base portion, wherein
the base portion includes a bottom surface facing an inner surface of the tire, and a plurality of protruding portions protruding from the bottom surface toward the inner surface of the tire,
the bottom surface is fixed to the inner surface of the tire with an adhesive interposed therebetween,
the plurality of protruding portions is in contact with the tire, and
a contact area between the plurality of protruding portions and the tire is equal to or larger than an installation area of the tire temperature detection unit on a top surface of the base portion.

2. The sensor for tires according to claim 1,
wherein the tire temperature detection unit is disposed in a central portion of the base portion,
wherein the plurality of protruding portions includes a plurality of first protruding portions disposed in the central portion of the base portion and a plurality of second protruding portions disposed in a peripheral edge portion of the base portion, and
wherein a density of the first protruding portions is higher than a density of the second protruding portions.

3. The sensor for tires according to claim 1, wherein the base portion includes a plurality of protruding portions to be inserted into an inner surface of the tire.

4. The sensor for tires according to claim 1, wherein in the base portion, at least a part of a portion where the tire temperature detection unit is not mounted is buried in the tire.

5. A sensor for tires comprising:
a base portion;
an adhesive configured to adhere the base portion to an inside of a tire;
a plurality of protruding portions protruding from a bottom surface of the base portion toward an inner surface of the tire;
a filler having a higher thermal conductivity than the adhesive; and
a tire temperature detection unit being supported by the base portion, the tire temperature detection unit configured to detect a temperature of the tire through the adhesive,
wherein the adhesive has a thermal conductivity of 1 [W/mK] or more because the adhesive is blended with the filler, and
a contact area between the plurality of protruding portions and the tire is equal to or larger than an installation area of the tire temperature detection unit on a top surface of the base portion.

6. The sensor for tires according to claim 1, further comprising a tire strain detection unit configured to detect strain of the tire through the base portion.

* * * * *